March 31, 1970     R. O. CARLSON     3,503,833
LAMINATED PANEL CONSTRUCTION AND METHOD OF MAKING SAME
Filed April 12, 1967

INVENTOR.
ROLAND O. CARLSON
BY Naylor & Neal
ATTORNEYS

United States Patent Office 3,503,833
Patented Mar. 31, 1970

3,503,833
LAMINATED PANEL CONSTRUCTION AND METHOD OF MAKING SAME
Roland O. Carlson, 17850 High Road,
Sonoma, Calif. 95476
Filed Apr. 12, 1967, Ser. No. 630,332
Int. Cl. B32b 3/18
U.S. Cl. 161—36                              5 Claims

ABSTRACT OF THE DISCLOSURE

A method of fabricating laminated panels comprising the steps of: cutting each of a plurality of planks of substantially equal thickness longitudinally in a plane transverse to its thickness dimension so that it is comprised of a pair of unconnected opposed mating sections; assembling the planks in side by side relationship while maintaining the opposed sections in mating relationship to define a pair of superimposed layers, each of which layers is made up of a plurality of the sections disposed edge to edge; applying a lamina to the outer surface of each of the layers to secure its sections in edge to edge relationship; and, separating the layers to define a pair of panels. The panels thus formed are faced by the cut surfaces of the planks and comprise mirror-like impressions of each other, as defined by the cut surfaces.

---

The present invention relates to the art of laminated panel construction and particularly is directed to the fabrication of panels of uneven surface character. The invention is especially concerned with the fabrication of panels suitable for use as exterior siding.

In the prior art, various techniques have been employed for the fabrication of laminated panels. The most typical of these techniques are those used for the construction of plywood panels. These techniques effect the lamination of very thin layers of uniform thickness to build up a composite panel having planar outer surfaces. Other similar lamination techniques employ a relatively thick core having one or more lamina applied to each side thereof to effect the formation of a composite panel. The composite panels resulting from the latter type of technique also have planar outer surfaces.

Prior art lamination techniques have also employed multipiece cores having lamina applied to the opposite sides thereof to effect the formation of a composite panel having planar outer surfaces. In some prior art techniques, composite laminated panels have even been cut subsequent to formation to effect the creation of an irregular outer surface. This cutting has been effected both to create individual board-like elements and integral panels having exterior surfaces simulating plural boards in appearance.

Prior art techniques employing cutting for the creation of boards from laminated panels, or the creation of board simulating surfaces on laminated panels, suffer certain disadvantages. One of the prime disadvantages is that they require the handling and cutting of relatively large panels which are, of necessity, difficult to manipulate. Another prime disadvantage inherent with these techniques is that they result in a considerable waste of material. Such waste is particularly prevalent where routing or similar cutting techniques are employed to create irregular surfaces. These prime disadvantages are accompanied by numerous ancillary disadvantages, such as panel fracturing and the creation of imperfect surfaces.

In summary, the present invention comprises fabricating laminated panels with surfaces comprised of boards by assembling superimposed pairs of board in side by side relationship and then adhering lamina to the backs of the boards to create a pair of superimposed panels which may be readily separated. The resulting panels are faced by individual boards which may be of irregular thickness to create any desired effect. Basic to the concept of the invention, however, is the provision that each pair of the superimposed boards be of a composite thickness substantially equal to that of every other pair. Through this provision, the laminae adhered to opposite sides of these superimposed boards are maintained parallel to each other and, thus, facilitated for application by relatively conventional clamping techniques.

It is, accordingly, a principal object of the present invention to provide a method of fabricating laminated panels whereby the panels may be faced by individual boards of varying thickness. With respect to this object, it is another and related object to provide such a method which avoids the shortcomings of the prior art.

Another object of the invention is to provide a laminated panel of durable construction and attractive appearance suitable for use as exterior siding.

The details of the invention and the foregoing and other objects will become more apparent when viewed in light of the accompanying drawings wherein.

Figure 1:
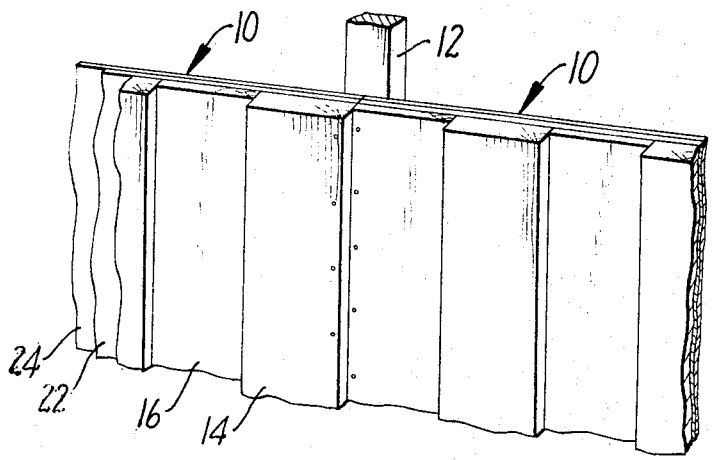
FIG. 1 is a perspective view, partially in section, illustrating a pair of panels constructed according to the invention.

Referring now specifically to FIG. 1, two panels constructed according to the invention are designated therein by the numeral 10. As illustrated, these panels are butted against each other and nailed in upright condition to a stud 12. This arrangement is considered typical of that which might be used when the panels are employed as exterior siding.

Figure 2:
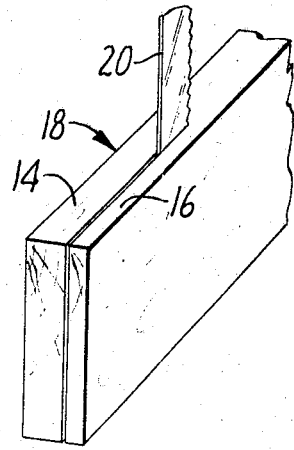
FIG. 2 is a partial perspective view diagrammatically illustrating a preferred technique for carrying out the first step of the inventive method wherein pairs of superimposed boards are provided; and, FIGS. 3, 4 and 5 are partial perspective views, respectively, sequentially illustrating the assembly, securing and separating steps of the method.

The first step in constructing a panel according to the present invention is to prepare a plurality of boards arranged in superimposed mating pairs. FIG. 2 illustrates a preferred technique to effect preparation of the boards. In this figure, the boards, designated by the numerals 14 and 16, are shown in the process of being cut from a unitary plank 18 by the blade 20 of a bandsaw (not illustrated). Preparation according to FIG. 2 is effected by cutting the plank 18 longitudinally to provide a pair of unconnected sections which define the boards 14 and 16. Through this process of preparation, the boards 14 and 16 mate perfectly and their opposed mating surfaces are mirror-like impressions of each other.

When preparing superimposed pairs of boards by the technique of FIG. 2, each plank 18 should be of the same thickness and cut in a plane transverse to the dimension across which this thickness is measured. This assures that the composite thickness of each pair of boards prepared by the technique will be equal. The thickness of the respective boards in each pair may, however, be varied. This is exemplified by FIG. 2 wherein the board 14 is shown as being approximately twice as thick as the board 16. By cutting each of the planks 18 with approximately these relative thicknesses, the panels fabricated from the planks may be arranged, through the assemblage step of FIG. 3, to have a final exterior appearance simulating that of board and bat lumber siding.

Figure 3:
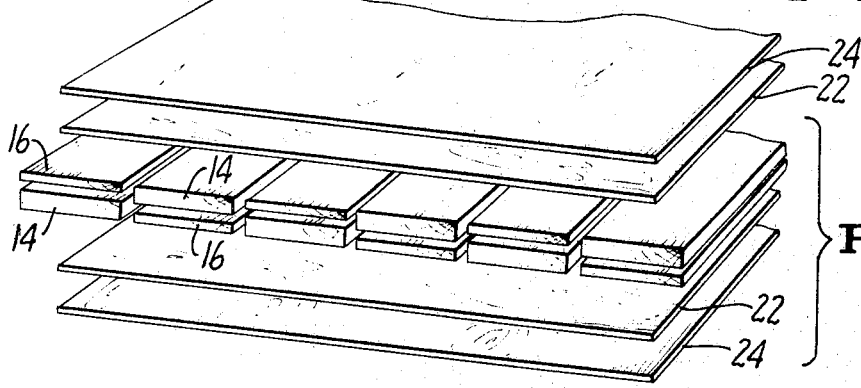

Once the superimposed pairs of boards are prepared, they are assembled in side by side relationship as illustrated in FIG. 3. As so assembled, the boards define a pair of superimposed layers, each of which is comprised of a plurality of boards disposed edge to edge. If the superimposed boards of each pair are prepared to different thicknesses, as illustrated in FIG. 2, and a board and bat simulating surface is desired on the panel being formed, the assemblage is effected so that the adjacent boards comprising each of the superimposed layers are, alternately, thick and thin relative to each other.

After the boards are assembled in side by side relationship, a lamina of cross-banding, designated by the numeral 22, is assembled across the outer surface of each of the superimposed layers defined by the boards. Assembly is then, preferably, completed by covering each of the laminae of crossbanding with a layer of veneer, designated by the numeral 24. This veneer may be formed of any desired material, depending upon the ultimate panel characteristics desired.

Throughout the entire method, the superimposed and edge surfaces of the boards are maintained free of glue. Glue is applied, however, between the opposed surfaces of the crossbanding and the boards and veneer on opposite sides thereof. This glue is applied during the assembly step illustrated in FIG. 3 in conventional manner.

Figure 4:
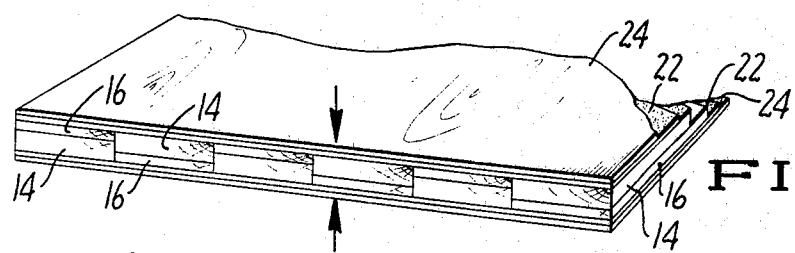

Upon completion of the assembly step, pressure is applied to the external surfaces of the layers of veneer 24, as designated by the arrow lines in FIG. 4. This pressure may be applied by any of the pressing operations well known to those skilled in the art and functions to force the assembly of veneer, cross-banding and boards into a tightly juxtaposed "sandwiched" condition. In the latter condition, the glue applied between each of the lamina of cross-banding and the layer of boards opposed thereto functions to secure the layers in adhered condition against the respective lamina of crossbanding. Simultaneously with this occurrence, the glue between each of the lamina of cross-banding and the layer of veneer in opposed thereto functions to secure the layers of veneer in adhered condition against the respective laminae of cross-banding.

Figure 5:
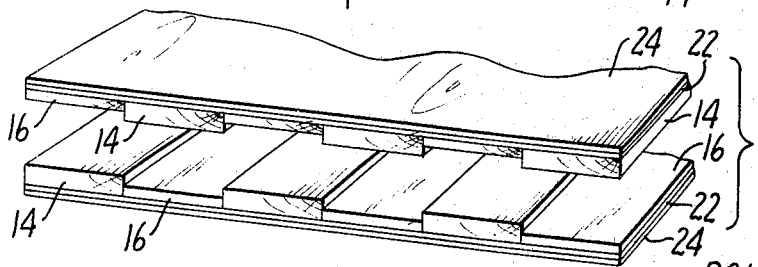

After completion of the pressing operation and resultant securing of the superimposed layers of boards in edge to edge relationship, the final step of the panel fabrication is effected, as illustrated in FIG. 5, simply by pulling the superimposed layers apart. This requires only a very slight force, since there is essentially no adhesion between the superimposed layers. The resulting product comprises two independent panels, each of which is faced on one side by the boards.

From the foregoing description, it is believed apparent that the present invention provides improved panel construction and a method of fabrication therefor. It should especially be appreciated that the method facilitates the creation of panels having irregular thicknesses through the employment of relatively conventional pressing operations. This results because the method provides an assembly of elements capable of being tightly pressed between conventional parallel surface pressing equipment.

What is claimed is:

1. A method of fabricating laminated panels, comprising:
   (a) cutting each of a plurality of planks of substantially equal thickness longitudinally in a plane transverse to the thickness dimension thereof so that each plank is comprised of a pair of unconnected opposed mating sections;
   (b) assembling said planks in side by side relationship while maintaining the opposed sections thereof in mating relationship to define a pair of superimposed layers, each of which is comprised of a plurality of said sections disposed edge to edge;
   (c) applying at least one lamina to the outer surface of each of said layers to secure the sections therein in edge to edge relationship; and,
   (d) separating said layers to define a pair of panels, said panels each being faced on one side by the lamina applied thereto and on the other side by the cut surfaces of the sections of the planks therein.

2. A method according to claim 1, wherein:
   (a) the surfaces of said planks between which the thickness dimensions thereof are measured are substantially parallel;
   (b) the longitudinal cutting of each of said planks is effected in a plane substantially parallel to said surfaces and spaced from the longitudinal centerline thereof to form the opposed sections thereof, respectively, of relatively thick and thin cross section; and,
   (c) the assembling of said planks in side by side relationship is effected so that the adjacent sections comprising each of said superimposed layers are, alternately, of relatively thick and thin cross section.

3. A method according to claim 2, wherein a plurality of laminae are applied to the outer surface of each of the layers, said laminae each comprising:
   (a) a layer of cross-banding applied directly to each of said surfaces; and,
   (b) at least one layer of veneer applied over said cross-banding.

4. A method of fabricating laminated panels, comprising:
   (a) providing a plurality of superimposed pairs of boards, the boards in each of said respective pairs being of unequal thickness and of a composite thickness substantially equal to the composite thickness of the other of said pairs;
   (b) assembling said pairs in side by side relationship to define superimposed layers each comprised of a plurality of said boards of alternating thickness disposed edge to edge;
   (c) applying at least one lamina to the outer surface of each of said layers to secure the boards therein in edge to edge relationship; and,
   (d) separating said layers to define a pair of panels, said panels each being faced on one side by the lamina applied thereto and on the other side by the boards therein.

5. A prefabricated siding panel comprising:
   (a) a planar backing lamina;
   (b) a first set of longitudinally rectilinear boards of substantially rectangular cross section adhered to said lamina in spaced parallel relationship to each other, the boards in said set being of a generally uniform thickness as measured from said lamina; and,
   (c) a second set of longitudinally rectilinear boards of substantially rectangular cross section adhered to said lamina in spaced parallel relationship between the boards in said first set, the boards in said second set being of a generally uniform thickness as measured from said lamina different from the thickness of the boards in said first set as measured from said lamina and disposed, respectively, in edge to edge contact with the boards in said first set.

(References on following page)

References Cited

UNITED STATES PATENTS

| | | | |
|---|---|---|---|
| 3,333,384 | 8/1967 | Brady | 52—313 XR |
| 2,139,880 | 12/1938 | Colucci | 161—36 XR |
| 2,664,835 | 1/1954 | Sorenson | 161—39 |
| 96,377 | 11/1969 | Anderson | 52—593 |
| 1,594,889 | 8/1926 | Loetscher | 144—316 |
| 2,191,070 | 2/1940 | Cone | 156—265 |
| 2,569,831 | 10/1951 | Ryall | 156—276 |
| 2,680,319 | 6/1954 | Dratler | 156—63 |
| 2,751,946 | 6/1956 | Gramelspacher | 144—316 |
| 3,003,205 | 10/1961 | Frashour et al. | 52—309 |

PHILIP DIER, Primary Examiner

U.S. Cl. X.R.

52—313; 144—315; 156—265, 300; 161—39